United States Patent
Lebech

(10) Patent No.: US 7,947,183 B2
(45) Date of Patent: May 24, 2011

(54) METHOD FOR REMOVING CONTAMINANT TRACE SPECIES, ESPECIALLY ARSENIC, FROM WATER

(75) Inventor: Finn Lebech, Taastrup (DK)

(73) Assignee: MicroDrop Aqua ApS, Taastrup (DK)

( * ) Notice: Subject to any disclaimer, the term of this patent is extended or adjusted under 35 U.S.C. 154(b) by 608 days.

(21) Appl. No.: 11/920,146

(22) PCT Filed: May 11, 2006

(86) PCT No.: PCT/DK2006/000250
§ 371 (c)(1),
(2), (4) Date: Dec. 31, 2007

(87) PCT Pub. No.: WO2006/119771
PCT Pub. Date: Nov. 16, 2006

(65) Prior Publication Data
US 2009/0020482 A1    Jan. 22, 2009

(30) Foreign Application Priority Data
May 12, 2005 (DK) ................. 2005 00694

(51) Int. Cl.
*C02F 1/58* (2006.01)
*C02F 1/74* (2006.01)
*C02F 101/10* (2006.01)

(52) U.S. Cl. ........ 210/712; 210/717; 210/721; 210/758; 210/908; 210/911

(58) Field of Classification Search ............ 210/712
See application file for complete search history.

(56) References Cited

U.S. PATENT DOCUMENTS

| | | | | |
|---|---|---|---|---|
| 2,171,203 A | * | 8/1939 | Urbain et al. | 210/717 |
| 3,461,067 A | * | 8/1969 | Hidenobu et al. | 210/717 |
| 3,931,007 A | * | 1/1976 | Sugano et al. | 210/717 |
| 4,382,865 A | * | 5/1983 | Sweeny | 210/743 |
| 4,565,633 A | * | 1/1986 | Mayenkar | 210/688 |
| 4,659,463 A | * | 4/1987 | Chandler et al. | 210/202 |
| 5,358,643 A | | 10/1994 | McClintock | |
| 5,368,703 A | | 11/1994 | Brewster | |
| 5,951,869 A | | 9/1999 | Heskett | |
| 6,197,201 B1 | * | 3/2001 | Misra et al. | 210/721 |
| 6,387,276 B1 | * | 5/2002 | Nikolaidis et al. | 210/719 |
| 6,942,807 B1 | * | 9/2005 | Meng et al. | 210/719 |
| 7,445,717 B2 | * | 11/2008 | Cha et al. | 210/709 |
| 2002/0003116 A1 | | 1/2002 | Golden | |

FOREIGN PATENT DOCUMENTS

| | | |
|---|---|---|
| DE | 197 45 644 A1 | 4/1999 |
| EP | 0 737 650 A2 | 10/1996 |
| JP | 2003-126874 A | 5/2003 |
| WO | 98/57893 A1 | 12/1998 |
| WO | 99/52829 A1 | 10/1999 |

* cited by examiner

*Primary Examiner* — Peter A Hruskoci
(74) *Attorney, Agent, or Firm* — The Nath Law Group; Jerald L. Meyer; Jiaxiao Zhang

(57) ABSTRACT

A method and a device for purifying water from contaminant trace species, especially arsenic, by co-precipitating trace species during oxidation and precipitation of iron compounds with subsequent separation. The co-precipitation is improved by contacting the water with an iron-containing material prior to oxidation to increase the iron content of the water. Arsenic and other trace species harmful to health may be removed from water effectively and in a simple manner, thus being able to comply with the more restrictive limits of arsenic in drinking water.

3 Claims, 1 Drawing Sheet

METHOD FOR REMOVING CONTAMINANT TRACE SPECIES, ESPECIALLY ARSENIC, FROM WATER

TECHNICAL FIELD

The present invention relates to a method and a device for purifying water from contaminant trace species, especially arsenic, by treating said water with iron and co-precipitating trace species during oxidation and precipitation of iron compounds with subsequent separation.

BACKGROUND ART

The presence of substances harmful to the environment or health in drinking water, even in very small amounts (so called trace species), has become a focus of attention for individuals as well as authorities, as knowledge and analytical techniques improve. Arsenic (As) in drinking water, for example, increases the cancer risk of human beings. Therefore, authorities have lowered the limit for As in drinking water from 50 µg/l to 5 µg/l. However, this resulted in a large number of waterworks failing to comply with a limit of 5 µg/l using existing methods, and hence had either to close down or to invest in expensive purification equipment. To this day, no profitable methods for this purpose are known capable of reducing the content of arsenic from a frequently encountered level of 20-35 µpg/l down to below 5 µg/l. The problem is particularly pronounced in waterworks having groundwater with a low iron content.

In waterworks with groundwater having a high content of iron compounds, the problem is less pronounced, since arsenic is co-precipitated with oxidized iron compounds, when the water is treated in a conventional way by oxidation, typically aeration, until iron precipitates in sand filters or precipitation basins. However, it is not possible to remove arsenic by conventional oxidation of water, if the iron content of the water is not sufficient to ensure the desired co-precipitation of present arsenic and other contaminants, including pesticides.

DE 197 45 664 A1 discloses a method for treating arsenic-containing water, where the water flows through a reactor filled with an iron-containing granulate, said granulate being produced by mixing sand and iron powder and subsequent firing under exclusion of oxygen. In the reactor, the iron is oxidized by the oxygen dissolved in water generating Fe(III) ions, said ions together with As forming poorly soluble iron arsenate. Excess Fe(III) ions are precipitated as iron hydroxide binding As by adsorption. Thus, As binds to the granulate, wherefrom it has to be removed at suitable intervals. When precipitating Fe(III) compounds, the granulate used agglomerates comparatively quickly and has to be exchanged frequently. The manufacture of the granulate requires work and energy. Moreover, the method requires the supply of additional oxygen to the reactor prior to treatment, if the treated groundwater is low in oxygen. In conclusion; the known method is work-intensive, complicated and expensive.

U.S. Pat. No. 5,951,869 describes a reactor, where water is treated with iron while simultaneously supplying oxygen. The treatment takes place in a fluid bed with iron particles as the source of iron. The use of a fluid bed is a high-cost and complicated method.

EP 0 737 650 A2 and U.S. Pat. No. 5,368,703 provide the enrichment of water with iron using an electrolytic method. The use of electrolysis is energy-intensive and complicated. WO 98/57893 (Nikolaidis) discloses the treatment of arsenic containing water with metallic iron under anaerobic conditions. The arsenic compounds are reduced and the iron is oxidized providing iron ions leading to co-precipitation of arsenic compounds but still under anaerobic conditions.

U.S. Pat. No. 5,358,643 (McClintock) discloses treatment of arsenic contaminated water with an iron salt, an acid and an oxidant until the water contains more iron than arsenic and has a positive oxygen/reduction potential (ORP) of about plus 600 mV ensuring that the arsenic will be pentavalent (step a). Then the water is made basic (step b) and the formed reaction mixture is reacted to precipitate compounds of As and Fe (step c) followed by separation of the precipitates from the water (step d). The steps a and b and in a preferred embodiment also step c are carried out without exposing the water/reaction mixture to air. Thus, an intentional active oxidation during the co-precipitation of As and Fe is not disclosed.

US 2002/0003116 A1 (Golden) discloses treatment of arsenic containing water first with an oxidant (hydrogen peroxide) and thereafter with an iron salt (ferric sulfate).

JP 2003 126874 A (Hitachi) teaches to feed the water to be treated to an oxidizing vessel where the water is aerated with an aerating means.

The above-mentioned methods have the common feature that the iron treatment takes place concomitant with aeration or requires that the water has a suitable oxygen content from the very start. Accordingly, there is an increased risk that the system is clogged by the precipitated oxidized iron compounds.

Hence, there is still a need for an uncomplicated and profitable method for removing arsenic and other trace species harmful to health from drinking water, especially drinking water based on low-iron groundwater.

DISCLOSURE OF INVENTION

It has been found that arsenic, optionally residual pesticides and other trace species harmful to health, are removable from water, especially drinking water, in a considerably less complicated and at the same time more efficient manner, if the water to be treated is first enriched with iron, while the oxygen content of the water is comparatively low, and subsequently exposed to strong aeration.

Accordingly, the present invention relates to a method for purifying water from contaminant trace species, especially arsenic, by treating said water with iron and co-precipitating trace species during oxidation, and precipitation of iron compounds with subsequent separation, characterized in that first, the water is contacted with an iron-containing material for enriching the water with iron compounds, then, the iron-enriched-water oxidizes for co-precipitation of the contaminant trace species together with oxidized iron compounds, and finally, the precipitated compounds are separated from the water.

The iron compounds may be added to the water in a simple and reliable manner at acceptable cost by contacting the water with an iron-containing material, preferably iron ore or metallic iron, particularly iron filings or swarfs, available as an inexpensive waste product in the form of calcinated waste iron from cutting machines. This may be accomplished by leading the water through a bed of iron ore, iron particles, iron filings or swarfs or any other natural iron-containing material having a large surface. The water may be distributed across the bed, e. g. by naturally spraying the bed, and after treatment, it may be removed from the bottom of the bed by means of suitable openings.

Next, the iron-treated water is led to a conventional aerator and, if necessary, a suitable filter, e. g. a sand filter, to remove arsenic and other trace species. This treatment is carried out in a conventional manner and ensures precipitation of iron compounds necessary for co-precipitation of arsenic and other trace species.

In a preferred embodiment, the water is returned once or several times after precipitation and separation of the iron compounds for renewed contact with the iron-containing material. With this treatment, the content of arsenic and other trace species may be reduced even further.

Thus, the method according to the invention permits to lower the content of substances harmful to health and environment, such as As and residual pesticides, in drinking water to a harmless low level below limits currently in force and in a profitable manner.

According to a particular embodiment, water is contacted with an iron-containing material under low-oxygen conditions, e. g. in a suitable closed system, such as a closed box. Thus, the formation of Fe(III)-containing compounds and premature precipitation of iron compounds is reduced.

The scope of the applicability of the invention will appear from the detailed description below. It is apparent, however, that the detailed description and the specific examples illustrating preferred embodiments of the invention are only given by way of example, and various alterations and modifications falling within the scope of the invention will become apparent to those skilled in the art upon reading the detailed description.

BEST MODES FOR CARRYING OUT THE INVENTION

During conventional treatment of groundwater to be used as drinking water one treatment process is the removal of the iron and manganese content from groundwater. This is accomplished by simple oxidation and filtration at waterworks. Traditionally, this treatment is carried out, because groundwater often contains iron in such high concentrations that it has to be removed prior to distribution. The content of iron compounds in the groundwater, said compounds mainly being Fe(II) compounds, is not harmful to health, but may cause problems with bacterial growth (iron-oxidizing bacteria), precipitation in the water distribution system, discoloration of clothes and basins, bad taste and clouding. Iron is removed by means of aeration and subsequent precipitation and filtration.

As mentioned above, several contaminant trace species co-precipitate with iron compounds, so that it is normally not a problem to comply with established limits of such substances.

However, not all waterworks have groundwater with such high iron concentrations. In such waterworks, the new more restrictive limits, in the case of As lowered by one order of magnitude from 50 $\mu m/l$ to 5 $\mu m/l$, cause serious problems, since co-precipitation with modest amounts of iron compounds is not sufficiently effective.

It has now been found, that the concentrations of As and other harmful substances in drinking water may be lowered in a surprisingly simple manner to well below the obligatory limits according to the present method by ensuring a sufficiently high iron concentration in the water prior to conventional oxidation and precipitation of oxidized iron compounds, typically Fe(III) compounds.

Preferably, the iron concentration in water is increased by contacting the water intimately with an iron material having a suitably large contact surface. An inexpensive material is iron swarfs, available as a waste product of machining, said swarfs having being calcinated prior to their use to remove residual cutting oil. Another material is iron ore.

In practice, the contact between water and the iron material may be achieved by spraying a suitable bed of iron material, for example a layer of iron swarfs having a thickness of 10-30 cm and arranged in a perforated tray made of plastic or stainless steel. The thickness of the bed of iron swarfs is adjusted so that the desired amount of iron to be added to the water is achieved. The tray is provided with a plurality of holes, e. g. having a diameter of 3-4 mm, at the bottom of the tray. The water is supplied to the bed of iron swarfs in a manner ensuring a good and uniform distribution. This may be accomplished in a manner well-known to a person skilled in the art, for example by means of a suitable number of nozzles or from an overhead distributor tray adapted as a drip tray with a plurality of holes so that the bed of iron swarfs is constantly sprayed with water. The water thereby takes up rust/iron, and the content of iron in the water increases.

The water thus enriched with iron is subsequently treated in a traditional manner by oxidation, precipitation and separation, usually by means of sedimentation and/or filtration, thus obtaining pure drinking water, said water not only being freed from iron and manganese again, but also freed from various contaminant trace species, such as for example As and pesticides co-precipitated with Fe(III) compounds.

As mentioned above, iron oxidation may be accomplished in a manner known per se in a conventional aeration device, such as a splasher, drip-type sheet, cascade aerator or by blowing in air or oxygen, resulting in precipitation and separation of Fe(III) compounds. In an advantageous embodiment, oxidation is accomplished in an aeration device of the type described in EP Patent No. 1 070 022. Usually, this device achieves an oxidation of water 10 times more effective compared to common known cascade aerators. Using suitable dimensioning a saturation of about 95% may thus be obtained.

EP 1 070 022 provides an aeration device for the treatment of water by means of a perforated plate being a plate formed with holes where water flows through at the beginning of the treatment and is changed into drops. Below the perforated plate, there is an assembly of ensuring a division of the drops. The assembly comprise several layers of tubular elements, the walls of each of said pipes being constructed of a wire net. The tubular elements in each layer are arranged horizontally and mutually in parallel, while the tubular elements in adjacent layers are arranged perpendicular to each other.

The method of operation of the aeration device includes groundwater being pumped to the top of the unit and running down over the tubular elements so that the water drops impinge on obstacles 60-80 times and are divided into microdrops prior to the water being collected in a collection container or basin, wherefrom the purified water may be withdrawn. Oxidized iron compounds are precipitated in the collection container, wherefrom they may be removed as necessary by light flushing. Subsequently, the water may be filtered, if required, typically in an sand filter, to ensure further precipitation of iron and trace species. In many cases however, separation in the collection container is sufficiently effective so that sand filtration may be dispensed with.

In combination with the above-mentioned aeration device the bed of iron material mentioned above, for example a bed of iron swarfs in a perforated tray made of plastic or stainless steel mentioned above, may be arranged directly above the aeration unit. Accordingly, groundwater may be pumped directly to the distributor tray above the bed of iron swarfs, where it passes first through the bed of iron filings without further pumps, where it is enriched with oxidizable iron compounds, whereupon it passes through the aeration device ensuring precipitation of the iron compounds and co-precipitation of contaminant trace species.

As mentioned above, precipitation in the collection container or basin is often satisfactory in the known aeration device, if necessary however, residual iron compounds with bound trace species may be precipitated during subsequent filtration, e. g. in a sand filter.

In practice, the bed of iron-containing material is dimensioned such that it is ensured that water takes up the amount of iron compounds necessary for binding present As, pesticides and other harmful trace species for binding them effectively to the iron which is precipitated during the aeration process.

To begin with, the invention was tested with respect to fulfilling the new more restrictive limit for arsenic in drinking water. However, initial experiments have also confirmed co-precipitation of pesticides and MTBE (methyl t-butyl ether) together with the oxidized iron compounds. One potential application of the method according to the invention relates to the removal of residual arsenic from chemically treated waste materials, such as chemically treated timber waste. Timber waste is immersed in a water basin, where residual arsenic eventually permeates into the water. The water from the basin is continuously pumped through a bed of iron-containing compounds and further through an aeration device and from there recycled back to the water basin. Precipitated iron compounds bind the arsenic dissolved in the water and settle at the bottom of the basin. The process continues, until the arsenic has been washed out of the wood to a satisfactory extent.

The method and device according to the invention are uncomplicated and inexpensive. The enrichment of water with iron requires no critical precise dosing of iron compounds, since a suitable system for distributing the water across the iron swarfs in a plastic tray having suitably dimensioned holes has been found to work in an effective manner over a long period of time, such as 6 months, until the iron swarfs ought to be exchanged. Accordingly, the device may be monitored by persons without any special training and is just as usable in industrial countries as it is in developing countries.

BRIEF DESCRIPTION OF THE DRAWING

The invention is explained in detail below with reference to the drawing, in which

As shown in FIG. 1, groundwater is pumped with a pump 1 over the top of the device to a drip tray 2, wherefrom it is uniformly distributed across a bed of iron swarfs 3 approx. 10 cm thick, said bed being arranged in a perforated plastic tray 4. During its passage through the bed 3 water takes up iron, predominantly in the form of Fe(II) compounds. From the plastic tray 4 water drips down to an aeration device of the type described in EP 1 070 022, where it is aerated effectively in an aeration chamber 5 filled with special tubular elements as described above, said tubular elements ensuring an air saturation of up to 95%. The aerated water is directed to a collection container 6, where precipitated iron compounds settle with co-precipitation of arsenic and other trace species. In a simple embodiment, pure drinking water may be taken out directly from the collection container 6, since sedimentation of the iron precipitate ensures sufficient separation. To improve sedimentation, the water from the collection container 6 may be fed to a sand filter 8 by means of a pump 7, wherefrom the pure drinking water 9 may be taken out.

Figure 1:
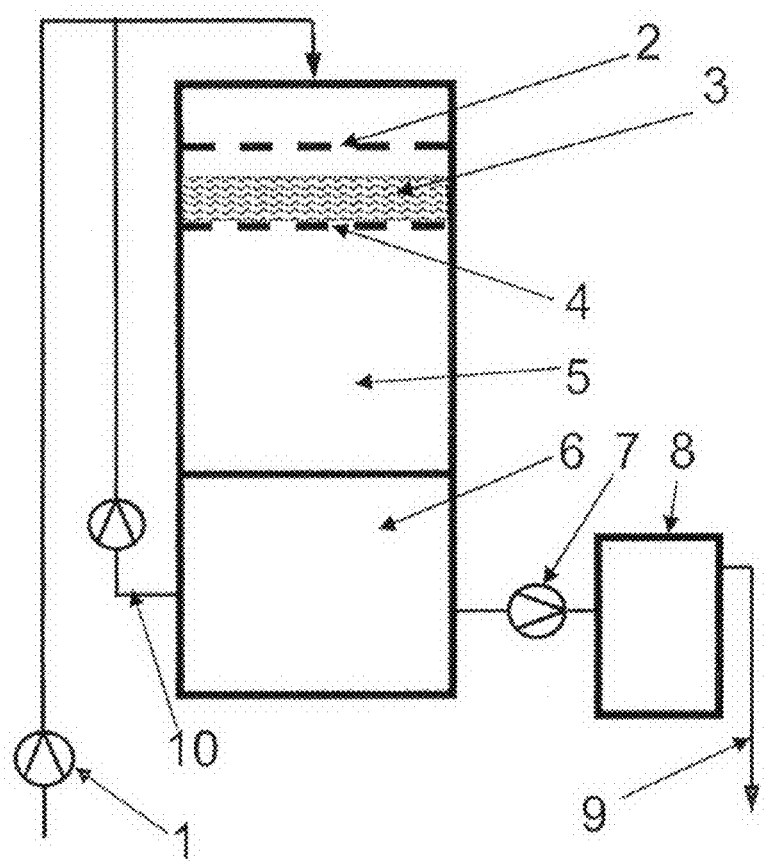
FIG. 1 is a schematic view of a device according to the invention having a bed of iron swarfs arranged above an aeration device.
Figure 2:
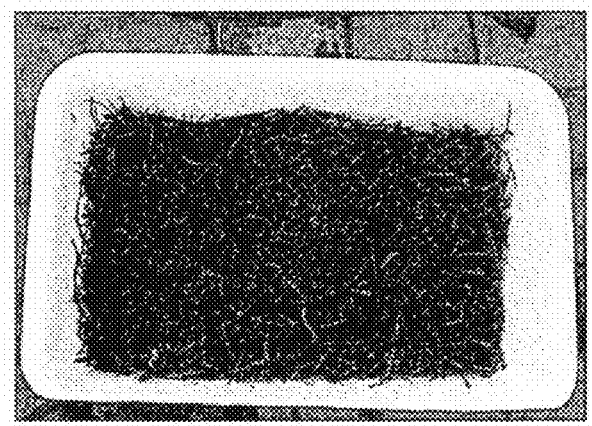
FIG. 2 shows the bed of iron swarfs in a plastic tray.

In another embodiment, the aeration chamber 5 may be formed as an empty gravity chamber, where water drops from the perforated plastic tray 4 are aerated during the free fall down in the collection container 6.

If the treated drinking water has an As content of above the limit 5 μm/l, the water in the collection container 6 may be recycled to the drip tray 2 at the top of the device through a pipe 10 using a pump for renewed treatment with iron addition and subsequent aeration and precipitation.

EXAMPLE 1

Above an aeration device of the type described in EP 1 070 022 (Microdrop-MP1L, available from MicroDrop Aqua, Taastrup, Denmark), there is arranged a bed of iron filings having a thickness of 10 cm in an approx. 700×550 mm perforated plastic tray, said bed having an overhead drip tray for distributing the water. Groundwater having a low iron content and 30 ppm As was introduced above the drip tray in an amount of 0.5 m$^3$/h. When passing through the bed of iron filings, the water took up approx. 1 mg iron per litre. After aeration to a saturation of up to 95% with precipitation of iron in the collection container, the water withdrawn therefrom had an As content of 10 ppm, i. e. one third of the original As content.

After a single passage, the water may be recycled for a new iron treatment, aeration and precipitation, thus reducing the As content to approx. 3-4 ppm, a value below the new more restrictive limit for drinking water.

EXAMPLE 2

The present example illustrates a device according to the invention provided for a flow of 0.05-1.0 m$^3$/h and set up at a waterworks. Iron swarfs are arranged in a bed with a thickness of 10 cm in a perforated 800×605 mm plastic tray. Before start-up of the device, the iron swarfs were sprinkled with water for 4 days to ensure rust formation on the surface of the iron swarfs. On the first day after start-up of the device, the supplied groundwater, the water after passage through the iron filings, the water in the collection container (tank) after the aerator and the water in the outflow of a sand filter, respectively, were analysed. The results are shown in table 1.

TABLE 1

| Analysis | Groundwater | After iron filings | Tank | Outflow |
| --- | --- | --- | --- | --- |
| Oxygen (mg/l) | 0.4 | 6.8 | 10.6 | 10.4 |
| Temperature (° C.) | 9.8 | 9.3 | 10.0 | 10.1 |
| Oxygen saturation (%) | 3.50 | 58.83 | 93.24 | 91.70 |
| pH | 7.03 | 7.33 | 7.64 | 7.75 |
| Redox potential (mV) | −42 | −30 | 45 | 157 |
| As (μg/l) | 14.8 | 10.5 | 8.5 | 4.3 |
| Fe (μg/l) | 1.36 | 8.46 | 4.33 | 0.25 |

As is apparent, the limit for As of 5 μg/l has been complied with.

The iron swarfs used are an inexpensive material usable for 6 months, based on experience. When treating groundwater with iron swarfs prior to aeration, severe coating of the iron swarfs are avoided, said coatings being capable of blocking the release of iron compounds into the water. To avoid the formation of coatings, the water ought not to remain in contact with the bed of iron swarfs over a longer period. In practice, the water is treated immediately after iron enrichment by passing through a bed of iron swarfs in an aeration device with strong aeration, whereupon iron and arsenic are precipitated, partly in the subsequent collection tank and partly in the sand filter.

The invention having been described herein, it is apparent that it may be modified in many ways. Such variations are not to be considered as deviating from the scope of the invention, and all such modifications apparent to those skilled in the art are to be understood as being comprised by the scope of the appended claims.

The invention claimed is:

1. A method for purifying water from contaminant trace species comprising arsenic and/or pesticides, by treating said water with iron and co-precipitating trace species during oxidation, and precipitation of iron compounds with subsequent separation, characterized in that
   a) first, the water is contacted with an iron-containing material in a closed system adapted for enriching the water with Fe(II) compounds, wherein the contact between iron and water is achieved by natural spraying of an iron-containing material arranged in a bed mounted above an aerator;
   b) then, the iron-enriched-water is oxidized for co-precipitation of the contaminant trace species together with oxidized iron compounds, wherein the iron-enriched water is oxidized by leading the water to the top of an aerator comprising a plate with holes for forming drops by flow of the water through the holes, and means arranged below said plate for causing division of the drops by contact therewith, wherein the means for causing division of the drops comprise a plurality of tubular elements in the form of pipes having pipe walls made of wire net, said tubular elements being placed in horizontal layers of several parallel tubular elements stacked in such a way that the tubular elements in adjacent layers are perpendicularly displaced in relation to each other; and letting the water run down through said aerator to the bottom thereof; and
   c) finally, the precipitated compounds are separated from the water.

2. The method according to claim 1, characterized in that the iron-containing material is iron ore or metallic iron, including iron particles, iron filings or swarfs, or any other natural iron-containing material having a large surface.

3. The method according to claim 1, characterized in that after co-precipitation of the trace species during oxidation and precipitation of iron compounds with subsequent separation, the water is recycled once or several times for renewed treatment comprising adding an additional amount of iron compounds with subsequent oxidation, precipitation of iron compounds and separation.

* * * * *